(12) United States Patent
Fujihara

(10) Patent No.: US 8,369,039 B2
(45) Date of Patent: Feb. 5, 2013

(54) APPARATUS AND METHOD FOR READING DATA FROM A TAPE

(75) Inventor: Shinobu Fujihara, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/464,806

(22) Filed: May 4, 2012

(65) Prior Publication Data

US 2012/0221786 A1 Aug. 30, 2012

Related U.S. Application Data

(63) Continuation of application No. 12/392,816, filed on Feb. 25, 2009, now Pat. No. 8,213,104.

(30) Foreign Application Priority Data

Feb. 26, 2008 (JP) .................................. 2008-45096

(51) Int. Cl.
*G11B 5/02* (2006.01)
*G11B 15/18* (2006.01)

(52) U.S. Cl. .......................................... 360/55; 360/69

(58) Field of Classification Search .................. None
See application file for complete search history.

(56) References Cited

U.S. PATENT DOCUMENTS

| 7,164,551 B2 | 1/2007 | Urano et al. |
| 8,213,104 B2 | 7/2012 | Fujihara |
| 2007/0053091 A1 | 3/2007 | Shiratori |

FOREIGN PATENT DOCUMENTS

| EP | 0 777 228 A2 | 4/1997 |
| JP | 08-018947 | 1/1996 |
| JP | 09-182028 | 7/1997 |
| JP | 10302450 A | 11/1998 |
| JP | 11297047 A | 10/1999 |
| JP | 2003046929 A | 2/2003 |
| JP | 2007059054 A | 3/2007 |
| JP | 2007087481 A | 4/2007 |

OTHER PUBLICATIONS

Notice of Allowance and Fee(s) Due from U.S. Appl. No. 12/392,816 dated Feb. 29, 2012.
Final Office Action Summary from U.S. Appl. No. 12/392,816 dated Dec. 16, 2011.
Non-Final Office Action Summary from U.S. Appl. No. 12/392,816 dated Jul. 12, 2011.
Final Office Action Summary from U.S. Appl. No. 12/392,816 dated Mar. 25, 2011.
Non-Final Office Action Summary from U.S. Appl. No. 12/392,816 dated Nov. 12, 2010.

*Primary Examiner* — Regina N Holder
(74) *Attorney, Agent, or Firm* — Zilka-Kotab, PC

(57) ABSTRACT

An apparatus and method for writing data to be played back onto a tape is provided. Included is an acquisition unit for acquiring data to be written onto the tape, a writing unit for writing the data to the tape, and a determination unit for determining a data amount of a leading part of the data to be stored in a place separate from a place where the data is stored so that a part following the leading part is made ready to be played back before playback of the leading part ends, to reduce the time taken to read the data from the tape. Also included is an extraction unit for extracting the data and a storage unit for storing the leading part of the data.

20 Claims, 11 Drawing Sheets

APPARATUS AND METHOD FOR READING DATA FROM A TAPE

RELATED APPLICATIONS

This application is a continuation of U.S. patent application Ser. No. 12/392,816, filed Feb. 25, 2009, which claims priority to Japanese Patent Appl. No. 2008-45096, filed Feb. 26, 2008, which priority is claimed, and are herein incorporated by reference.

BACKGROUND OF THE INVENTION

1. Field of the Invention

The present invention relates to an apparatus and method for writing data onto a tape, and more particularly, to an apparatus and method for writing data to be played back onto a tape.

2. Background Information

Systems for distributing various types of content data, such as video data, via a network such as the Internet are known. A recording medium that content data can be recorded and accumulated onto is a challenge for such systems. If the amount of data is relatively small, a magnetic disk is often used and provides a balance between price and performance. If the amount of content data is relatively large, a hierarchical storage system for recording data that is accessed infrequently may be employed using a magnetic data storage tape.

A disadvantage of recording content data onto a magnetic tape is that it takes more time for playback of the content to start playing, than if the data is recorded onto a magnetic disk. Various solutions have been proposed to solve this problem.

One known solution comprises pre-stripping a beginning portion, such as an initial five minutes, of numerous, i.e. several hundred, video files to one or more disk arrays. Upon receipt of a request for one of the video files from a user, the corresponding pre-striped video data is provided to the user. Simultaneously, the remaining portion of the video file is called from an archival storage unit and transferred to the disk array. Thus, delay of providing the video data file to the user is minimized.

Another known solution comprises storing a portion of a file, such as data from a video file, in a first storage unit, such as a magnetic tape, and pre-loading a portion of the file into a second storage unit, such as a magnetic disk. Upon receipt of a request for video data from a user, the part of the video file stored in the second storage unit is transferred to the user. At the same time, the remainder of the video file stored in the first storage unit is transferred to the second storage unit so that the remainder is transferred to the user. Thus, the delay time caused with respect to the first storage unit is minimized.

Accordingly, there is a clearly-felt need in the art for an apparatus and method for reducing the time taken before data, all of which is recorded on a tape, starts to be played back.

SUMMARY OF THE INVENTION

In one embodiment, an apparatus for writing data to be played back onto a tape. The apparatus includes an acquisition unit for acquiring data to be written onto the tape, a writing unit for writing the data acquired by the acquisition unit onto the tape, a determination unit for: in order to reduce a time taken to read the data from the tape, determining a data amount of a leading part of the data to be stored in a place separate from a place where the data is stored so that a part following the leading part is made ready to be played back before playback of the leading part ends, an extraction unit for extracting the leading part having the data amount determined by the determination unit from the data acquired by the acquisition unit, and a storage unit for storing the leading part extracted by the extraction unit.

In another embodiment, an apparatus for writing data to be played back onto a tape. The apparatus includes: an acquisition unit for acquiring data to be written onto the tape; an extraction unit for extracting a first part and a second part following the first part from the data acquired by the acquisition unit; a determination unit for determining a distance between a position at which the first part is written and a position at which the second part is written, so that the second part is made ready to be played back before playback of the first part ends; and a writing unit for writing the first part at a predetermined position on the tape and the second part at a position located away from the predetermined position by the distance determined by the determination unit.

In another embodiment, a method for writing data to be played back, onto a tape. The method includes the steps of: acquiring data to be written onto the tape; writing the acquired data onto the tape; in order to reduce a time taken to read the data from the tape, determining an data amount of a leading part of the data to be stored in a place separate from a place where the data is stored so that a part following the leading part is made ready to be played back before playback of the leading part ends; extracting the leading part having the determined data amount from the acquired data; and a storage unit for storing the extracted leading part in predetermined storage means.

In one embodiment, a program product for causing a computer to serve as an apparatus for writing data to be played back onto a tape. The program product causes the computer to serve as: an acquisition unit for acquiring a plurality of pieces of data to be written onto the tape; and a writing unit for writing respective first parts of the pieces of data acquired by the acquisition unit in a first area on the tape and respective second parts of the pieces of data following the first parts in a second area on the tape so that the second parts are made ready to be played back before playback of the first parts ends.

Other, advantages and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a", "an", and "the" include plural referents unless otherwise specified.

Figure 1:
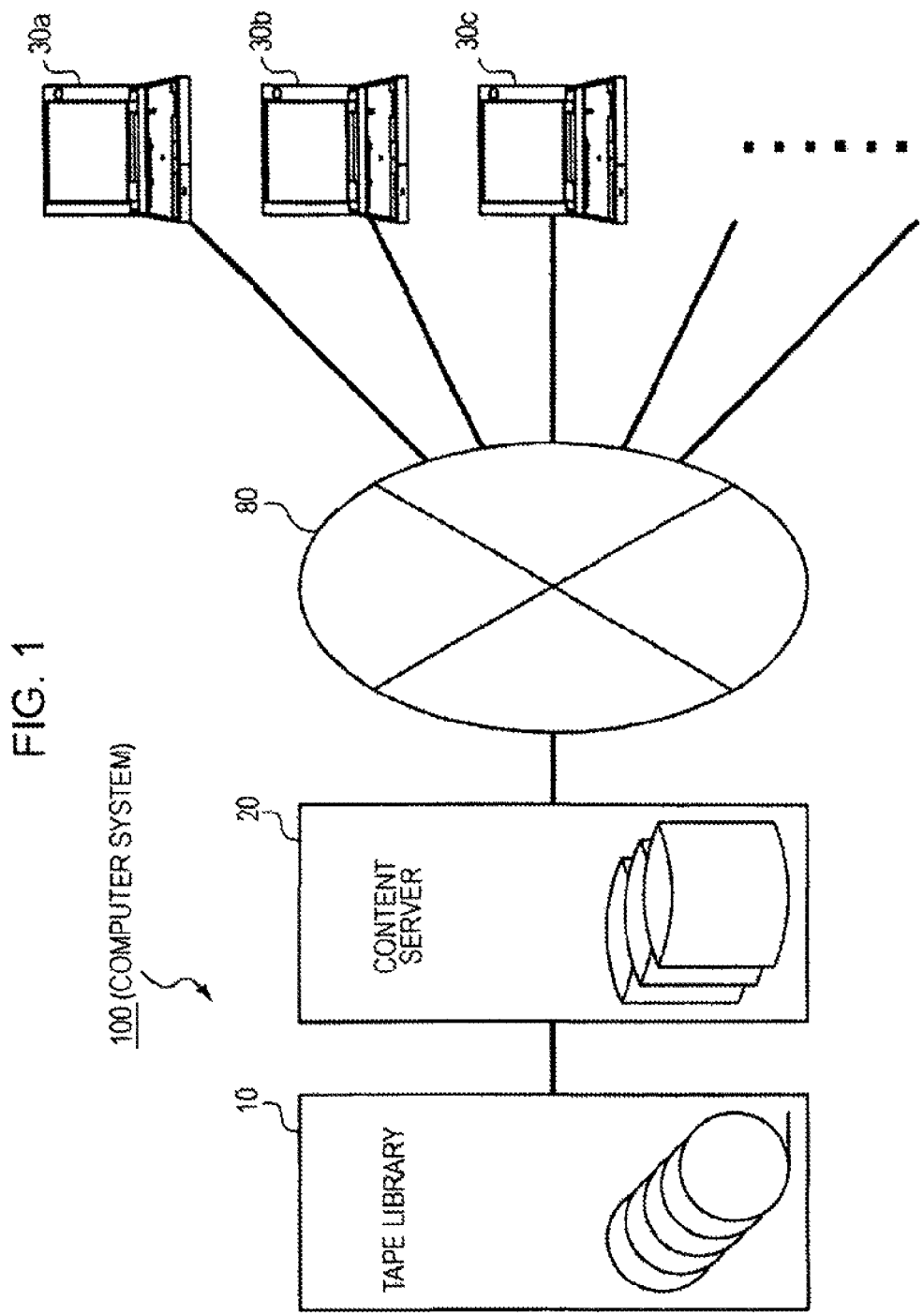
FIG. 1 is a schematic diagram showing an overall configuration of a computer system.

Referring now to the accompanying drawings, and in particular, to FIG. 1, there is shown an embodiment of a configuration of a computer system 100 where an embodiment of the invention may be applied. The computer system 100 may include a tape library 10, a content server 20, and clients 30a, 30b, 30c, etc., that are connected via a network 80 so as to communicate with each other.

The tape library 10 is a device for writing or reading data onto or from a magnetic tape by selecting a desired one from among multiple magnetic tape cartridges and loading the selected cartridge into a tape drive. For example, the multiple magnetic tape cartridges are previously stored in multiple slots, and a robot mechanism (changer) takes a requested magnetic tape cartridge out of a slot and transports and loads the cartridge to the tape drive. While a tape from or onto which data is to be read or written in the tape library 10 is typically a magnetic tape, it may be a tape other than a magnetic tape. For this reason, a tape will be simply referred to as a "tape" rather than as a "magnetic tape."

The content server 20 is a server computer for, according to a request from any of the clients 30a, 30b, 30c, etc., providing content recorded on a tape to the client. The "content" here refers to digital data obtained by digitizing a set of information that users can view on the clients 30a, 30b, 30c, etc. Also, this embodiment is targeted for content that can be played back, such as video (moving picture) and music. The content server 20 may be administered by a content provider or a business entity other than a content provider. In any case, the content server is preferably connected to terminals (for example, clients 30a, 30b, 30c, etc.) for requesting storage of new content. While this embodiment is applied to content as an example of data, it is also applicable to digital data obtained by digitizing information that is not intended to be viewed by a user as long as the digital data can be played back.

The clients 30a, 30b, 30c, etc. are terminals used when users view content and may be, for example, personal computers (PCs). While the clients 30a, 30b, 30c, etc. have been described as clients, the clients will be simply referred to as a "client 30" in the following description unless any of these clients is specified.

In this embodiment having the above-described system configuration, the content server 20 includes a disk cache, which constitutes a storage unit for a digital archive system together with the tape library 10. In this case, it takes more time from the time when playback of content is requested to the time when the playback is started if the content is not hit in the disk cache and thus must be recalled from a tape than if the content is hit in the disk cache.

In this embodiment, the top (hereafter referred to as a "leading part") of content and all of the content (hereafter referred to as "full content") are stored separately. The data stream rate of content typified by video data is lower than the data transfer rate between the disk cache and tape drive. For example, the transfer rate of MPEG2 data is 50 Mbps, while the data transfer rate of linear tape-open (LTO) fourth generation data is 960 Mbps. Therefore, if a certain amount of the leading part of content is stored in the disk cache, a request for playback of the content is responded. Also if, prior to the completion of the playback of the leading part, data transfer of the full content is started between the disk cache and tape drive, the playback is continued.

Figure 2:
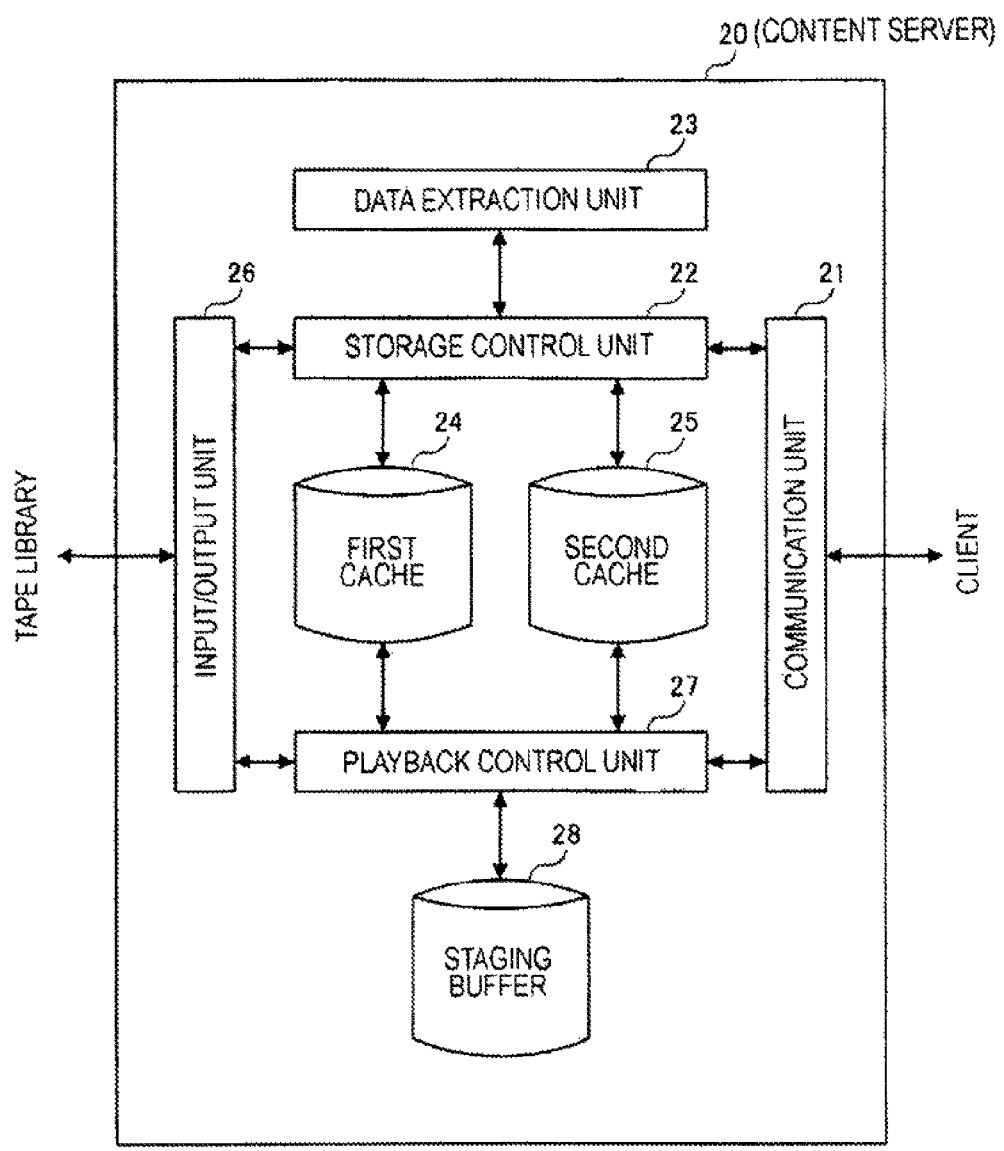
FIG. 2 is a schematic diagram showing an embodiment of a functional configuration of a content server.

Referring to FIG. 2 an embodiment of a functional configuration of the content server 20 includes a communication unit 21, a storage control unit 22, a data extraction unit 23, a first cache 24, and a second cache 25. The content server 20 also includes an input/output unit 26, a playback control unit 27, and a staging buffer 28.

The communication unit 21 receives content sent for a storage purpose or a request for playback of content, for example, from the client 30. The communication unit 21 also sends content read out according to a request for playback of the content, for example, to the client 30. In this embodiment, the communication unit 21 is provided as an example of an acquisition unit for acquiring data.

The storage control unit 22 receives content from the communication unit 21, stores the full content in the first cache 24, and then sends it to the input/output unit 26 so as to copy it onto a tape. Such recording of content onto a tape will be referred to as "pre-migrate" in this specification. As is understood from the above-description, if the content is made to pre-migrate almost at the same time that the content is recorded into the first cache 24, the content data is prevented from being lost when a failure has occurred in the first cache 24. Also, the storage control unit 22 stores the leading part of the content in the second cache 25. In this case, the size of the leading part to be stored depends on the time taken to read the top of a content part (hereafter referred to as a "trailing part") following the leading part. In this embodiment, the storage control unit 22 is provided as an example of a determination unit for determining the data amount of the leading part or the distance between writing positions on a tape.

The data extraction unit 23 extracts specified data from content passed from the storage control unit 22. The specified data here refers to, for example, the leading part described above. In this embodiment, the data extraction unit 23 is provided as an example of an extraction unit for extracting from data a predetermined part thereof.

The first cache 24 stores content sent from the storage control unit 22. It should be noted that if the number of pieces of content stored in the first cache is increased and the total data amount of content exceeds the capacity of the first cache 24, a piece of content that has been least recently used and is least required to be stored in the first cache 24 is eliminated from the first cache 24 one after another. If pieces of content have been eliminated from the first cache 24 in this way, the pieces of content only exist on a tape at that point of time. This state will be referred to as "migrate" in this specification. The first cache 24 serves as a disk cache with respect to a tape and may be, for example, a semiconductor memory.

The second cache 25 stores the leading part of content stored in the first cache 24. It should be noted that if the total data amount of content exceeds the capacity of the second cache 25, a piece of content that has been least recently used is eliminated from the second cache 25 one after another. The second cache 25 may be, for example, a semiconductor memory. In this embodiment, the leading part is used as an example of the top of data and the second cache 25 is provided as an example of a storage unit for storing the top.

The input/output unit 26 outputs content to the tape library 10 so as to write the content onto a tape. Also, the input/output unit 26 receives content read from a tape so as to be played back, from the tape library 10. In this embodiment, the input/output unit 26 is provided as an example of a writing unit for writing data onto a tape.

The playback control unit 27, upon receipt of a request for playback of content from the communication unit 21, reads the content from the first cache 24 if the content is present in the first cache 24, and then sends the content to the communication unit 21. If the content is not present in the first cache 24, the playback control unit 27 reads the leading part of the content from the second cache 25 and the full content from a tape, and then controls the playback of the content using the read leading part and full content.

It should be noted that even if the content is present in the first cache 24, the playback control unit 27 may control playback of the content by using the leading part read from the second cache 25 and the full content read from a tape if a read and playback of another content from the first cache 24 is in progress and a read and playback of the content may affect the quality of the current playback of another content. If the playback control unit 27 controls playback of the control by using the leading part and the full content, it sends the leading part read from the second cache 25 to the communication unit 21 and receives the full content read from the tape, from the input/output unit 26 and then sends it to the staging buffer 28. Or the playback control unit 27 may send the trailing part following the leading part, rather than the full content, to the staging buffer 28. This is because the combination of the leading part and trailing part constitutes the full content. In this case, the playback control unit 27 sends the leading part and then trailing part to the communication unit 21. Note that playback of the trailing part may be started before all of the trailing part is read from the tape. That is because the rate at which data is transferred from the tape to the staging buffer 28 is higher than the rate at which playback data is transferred to playback the content.

The staging buffer 28 is a buffer for temporarily storing full content read from a tape. The staging buffer 28 may be, for example, a magnetic disk.

As is understood from the above-description, the content server 20 reduces the time taken before playback of content recorded on a tape is started by storing the leading part of the content in the second cache 25. However, if the number of stored leading parts is continuously increased, for example, a leading part that has been least recently used is transferred to a tape one after another, since the capacity of the second cache 25 is limited.

In this embodiment, the content is recorded on a tape using the following recording method. That is, first, in order to buffer the leading part more quickly, an area on a tape is divided into a leading part area and a full content area. An area from which data recorded on the tape is read most quickly is used as the leading part area. Accordingly, the leading parts are collected into this area. Also, the recording length of a leading part is determined such that the trailing part starts to be played back at the time when playback of the leading part ends.

Figure 3:
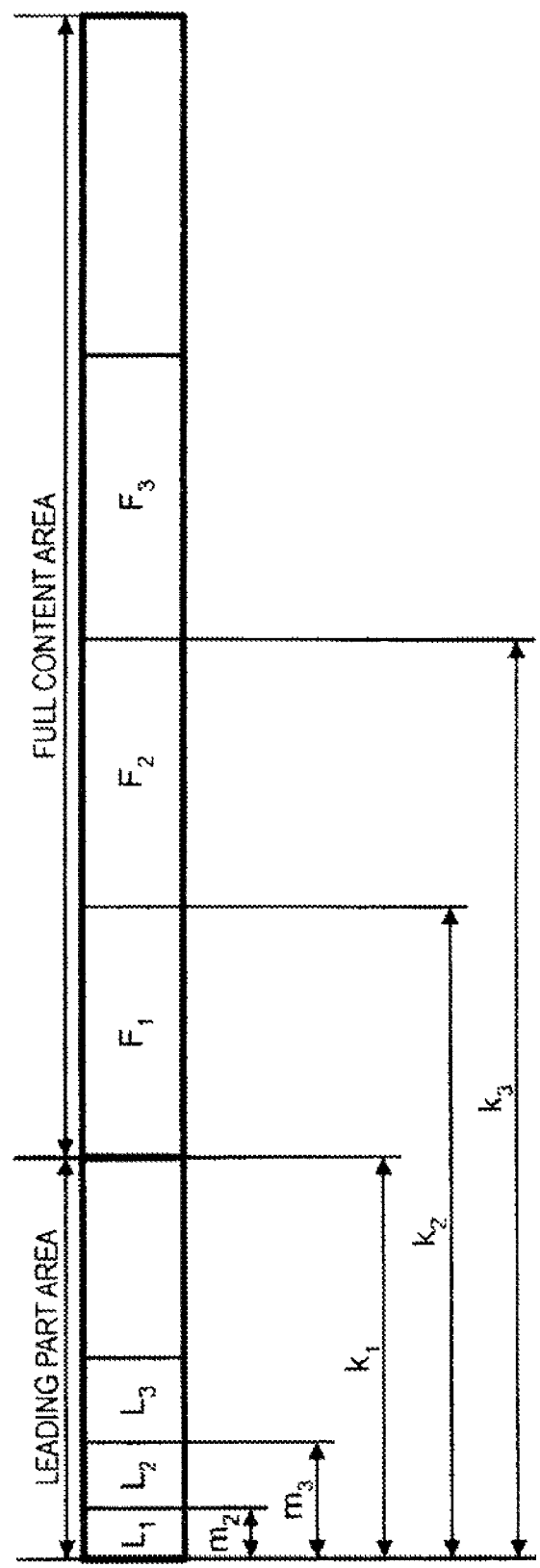
FIG. 3 is a schematic diagram showing an embodiment of a tape format in which data is recorded.

Referring now to FIG. 3, an embodiment of a recording format on a tape according to a first recording method includes, the leading parts and pieces of full content are stored on an identical tape. Specifically, an area on a tape is divided into a leading part area and a full content area. The leading parts are recorded in the leading part area and pieces of full content corresponding to the leading parts are recorded in the full content area.

The length of a leading part to be recorded in the leading part area is determined according to the distance from the recording position of the leading part to the recording position of the trailing part of the corresponding full content. If this distance is long, the recording length of the leading part is also increased. If this distance is short, the recording length of the leading part is also reduced. Thus, the leading part area is efficiently used.

The leading part of the j-th piece of content is represented by $Lj$, the full content of the j-th piece of content is represented by $Fj$, the distance from the top of the tape to the recording start position of $Lj$ is represented by $mj$ (mm), and the distance from the top of the tape to the recording start position of $Fj$ is represented by $kj$ (mm) ($j=1, 2, 3 \ldots$). The top of the tape refers to the top of a recordable area on the tape and it is assumed that $m1=0$. Also, the data amount of $Lj$ is represented by $bj$ (byte), the recording density of data on the tape is represented by $Bpl$ (byte/mm), the moving speed of the tape is represented by $Ls$ (mm/sec), and the playback speed of the content is represented by $Bpps$ (byte/sec). In this case, the following relation is established among $mj$, $kj$, and $bj$.

$$bj/Bpps=(kj-(mj+bj/Bpl)+bj/Bpl)/Ls+\alpha \quad \text{Formula 1}$$

Formula 1 illustrates that the tape has reached at least the recording start position of the trailing part following the leading part $Lj$ in the full content $Fj$ at the time when playback of the leading part $Lj$ ends.

"$kj-(mj+bj/Bpl)$" in the right side of Formula 1 represents the distance from the recording end position of the leading part $Lj$ to the recording start position of the full content $Fj$. Note that since the full content $Fj$ includes the leading part $Lj$, "$bi/Bpl$" is added to "$ki-kj-(mj+bj/Bpl)$" to obtain the distance from the recording end position of the leading part $Lj$ to the recording start position of the trailing part following the leading part $Lj$.

Generally, data read from a tape is not immediately transferred to the next step. For example, data is subjected to an error check or the like on a block-by-block basis and then transferred. That is, transfer of the data is started after a delay of blocks. Here, it is considered that playback of the leading part $Lj$ is preferably completed a short time after the tape reaches the recording start position of the trailing part in the full content $Fj$ rather than at the same time that the tape reaches the recording start position of the trailing part in the full content $Fj$. For this reason, Formula 1 includes an allowance $a$ in its right side.

Figure 4:
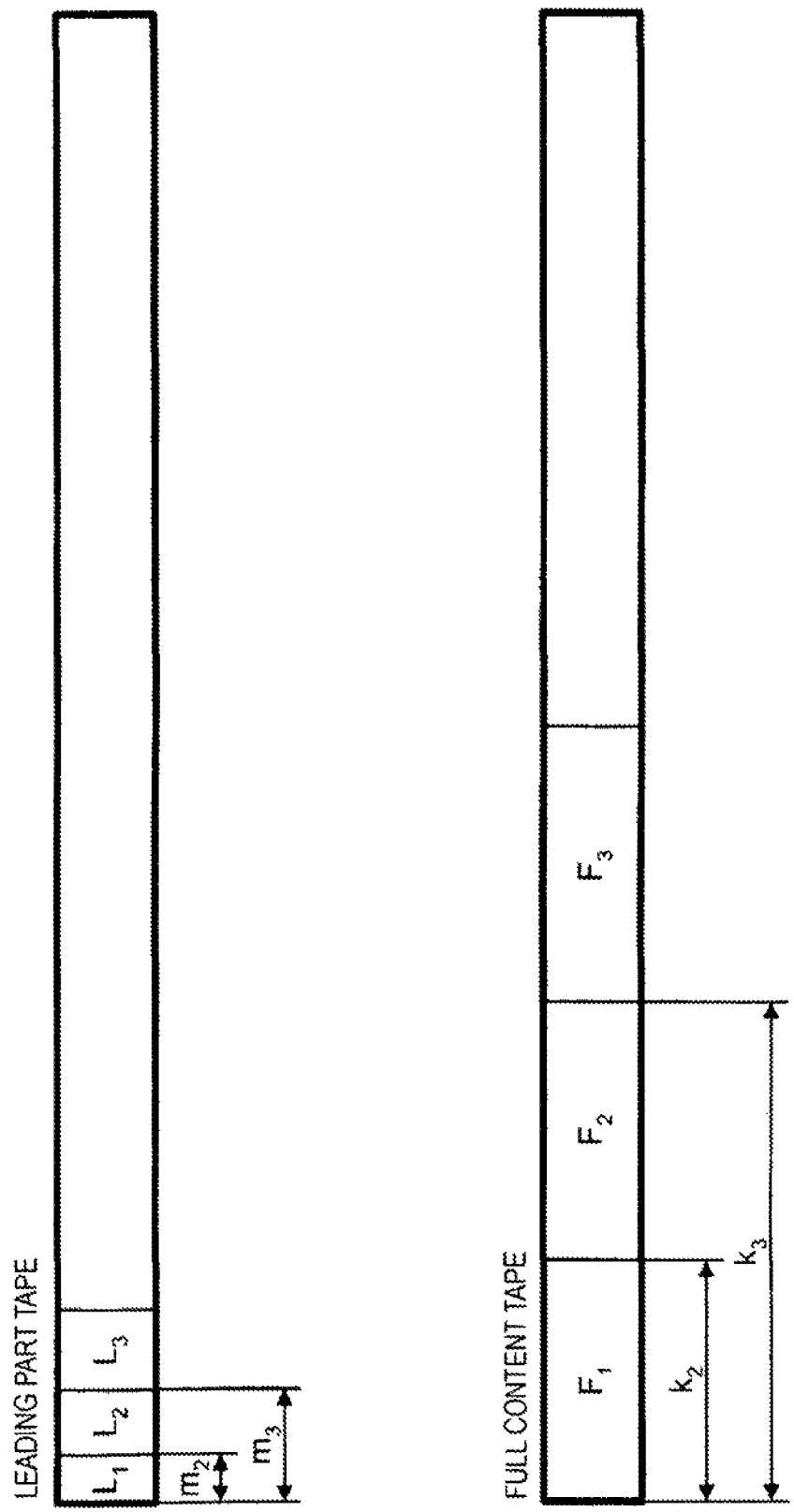
FIG. 4 is a schematic diagram showing an embodiment of a tape format in which data is recorded.

From Formula 1, $bj$ is expressed as follows.

$$bj=(kj-mj+\alpha \times Ls)\times Bpps/Ls \quad \text{Formula 1'}$$

referring to FIG. 4, there is shown an embodiment of a recording format on a tape used when performing a second recording method. In the second recording method, the leading parts and pieces of full content are stored on different tapes. That is, multiple tapes are used as leading part tapes and full content tapes separately. The leading parts of pieces of content are recorded on the leading part tapes and pieces of full content corresponding to the leading parts are recorded on the full content tapes. This allows many leading parts to be stored on one tape. Therefore, if such a tape is loaded into a tape drive, more leading parts can be read without having to load another tape. Also, many leading parts can be called back from a tape to the second cache 25 at a time.

The length of a leading part to be recorded on a leading part tape is determined according to the distance from the top of a full content tape to the recording position of the trailing part in full content corresponding to the leading part. If this distance is long, the recording length of the leading part is also increased. If this distance is short, the recording length of the leading part is also reduced.

Here, the leading part of the j-th piece of content is represented by Lj, the full content of the j-th piece of content is represented by Fj, the distance from the top of the tape to the recording start position of Lj is represented by mj (mm), and the distance from the top of the tape to the recording start position of Fj is represented by kj (mm) (j=1, 2, 3 . . . ). Here, the top of the tape refers to the top of a recordable area on the tape and it is assumed that m1=0 and k1=0. Also, the data amount of Lj is represented by bj (byte), the recording density of data on the tape is represented by Bpl (byte/mm), the moving speed of the tape is represented by Ls (mm/sec), and the playback speed of the content is represented by Bpps (byte/sec). In this case, the following relation is established among mj, kj, and bj.

$$bj/Bpps=(kj-bj/Bpl)/Ls+\alpha+\beta \qquad \text{Formula 2}$$

Formula 2 means that the tape has reached at least the recording start position of the trailing part following the leading part Lj in the full content Fj at the time when playback of the leading part Lj ends.

"kj" in the right side of Formula 2 represents the distance from the top of the tape to the recording start position of the full content Fj. Note that since the full content Fj includes the leading part Lj, "bj/Bpl" is added to "kj" to obtain the distance from the top of the tape to the recording start position of the trailing part following the leading part Lj.

For the same reason as that described with respect to Formula 1, Formula 2 includes an allowance a in its right side. Further, in this recording method, it is preferable to administer the leading part tape and full content tape in such a manner that the leading part tape is previously loaded in the tape drive and the full content tape is, upon request, transported by a robot mechanism and loaded into the tape drive. For this reason, Formula 2 also includes the time taken by this transportation and the like as an allowance β.

From Formula 2, bj is expressed as follows.

$$bj=(kj+(\alpha+\beta)\times Ls)\times Bpl\times Bpps/(Bpl\times Ls-Bpps) \qquad \text{Formula 2'}$$

In the computer system 100 according to this embodiment, pieces of full content may be transferred from the first cache 24 to a tape. In this case, a third recording method shown below may be employed as a method for recording pieces of full content on a tape.

Figure 5:
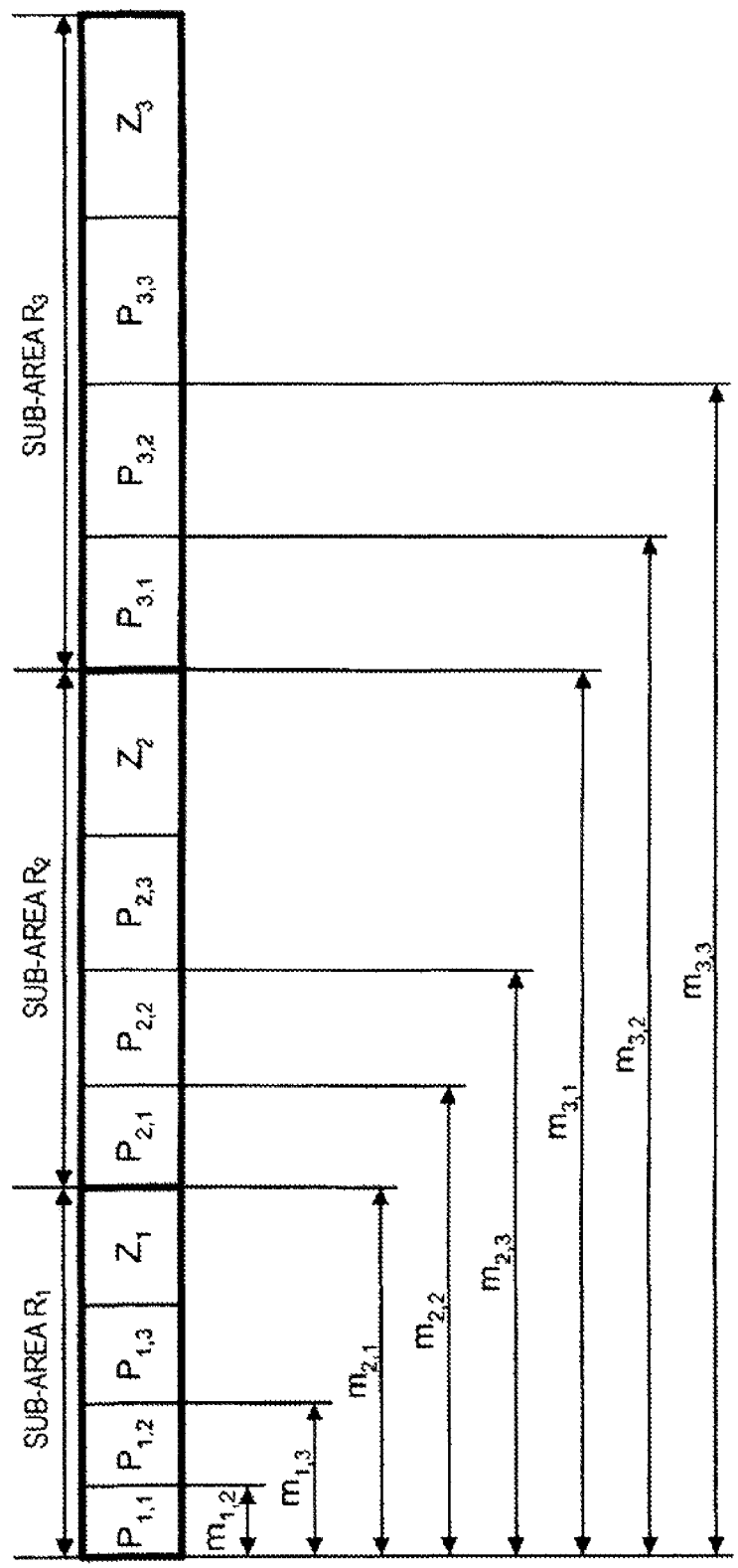
FIG. 5 is a schematic diagram showing an embodiment of a tape format in which data is recorded.

Referring to FIG. 5, there is shown another embodiment of a recording format on a tape used when performing the third recording method.

According to the third recording method, multiple pieces of content are simultaneously buffered; therefore, the multiple pieces of content are simultaneously played back in a pseudo manner. That is, an area on a tape is divided into multiple sub-areas. In FIG. 5, an area on a tape is divided into sub-areas R1, R2, and R3. Partial content Pi,1 as a part of first content, partial content Pi,2 as a part of second content, partial content Pi,3 as a part of third content is sequentially recorded on a sub-area Ri. Also, a blank area Zi is prepared so as to record partial content additionally using the same method (i=1, 2, 3).

In this embodiment, it is assumed that the speed at which data is read or transferred at a tape drive is sufficiently higher than the speed (e.g., video playback speed) at which the read data is played back at a data playback apparatus. It is also assumed that this speed difference is absorbed by a buffer unit provided between the tape drive and data playback apparatus. Therefore, if a distance mi,j−mi−1,j between partial content Pi−1,j recorded on a sub-area i−1 and partial content Pi,j following the partial content Pi−1,j is a distance that the tape can travel within a playback time of partial content Pi−1,j, data is continuously provided to the data playback apparatus. For example, if the data read speed or data transfer speed is ten times the data playback speed, mi,j−mi−1,j may be set to ten times the recording length of Pi−1,j.

Here, j-th partial content recorded on the sub-area Ri is represented by Pi,j and the distance from the top of the tape to the recording start position of Pi,j is represented by mi,j (mm) (i=1, 2, 3 . . . , j=1, 2, 3 . . . ). The top of the tape here refers to the top of a recordable area on a tape and it is assumed that m1,1=0. Also, the data amount of Pi,j is represented by bij (byte), the recording density of data on the tape is represented by Bpl (byte/mm), the moving speed of the tape is represented by Ls (mm/sec), and the playback speed of the content is represented by Bpps (byte/sec). In this case, the following relation is established among bi−1,j, bi−1,j+1, and bi,j.

$$bi-1,j+1/Bpl+(bi-1,j+1/Bpps)\times Ls=(bi-1,j/Bpps)\times Ls+bi,j/Bpl \qquad \text{Formula 3}$$

Formula 3 means that the sum of the recording length of partial content Pi−1,j+1 and the distance from the recording end position of the partial content Pi−1,j+1 to the recording start position of partial content Pi,j+1 following the partial content Pi−1,j+1 is equal to the sum of the distance from the recording end position of partial content Pi−1,j to the recording start position of the partial content Pi,j following the partial content partial content Pi−1,j and the recording length of the partial content Pi,j.

From Formula 3, bi,j is represented as follows.

$$bi,j=bi-1,j+1+(bi-1,j+1-bi-1,j)\times Bpl\times Ls+/Bpps) \qquad \text{Formula 3'}$$

Next, operations of the content server 20 according to this embodiment will be described. First, operations performed when the content server 20 stores content will be described. The communication unit 21 receives content and a request for storage of the content. Here, it is assumed that the content storage request includes content identification information (content ID). Then, the communication unit 21 passes the content and storage request on to the storage control unit 22. Thus, the storage control unit 22 starts operations.

Figure 6:
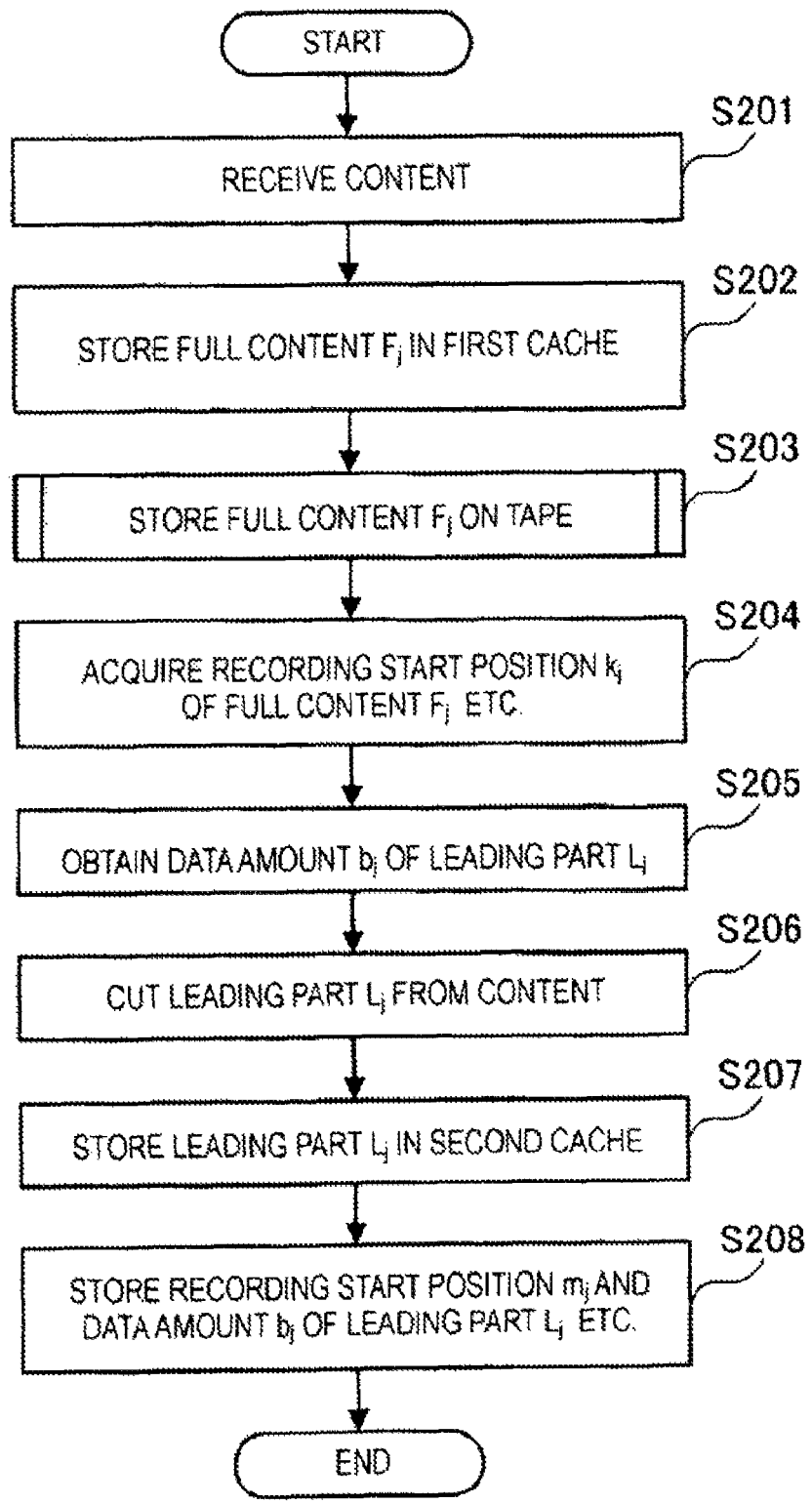
FIG. 6 is a flowchart showing an embodiment of operations performed when the content server writes content.

FIG. 6 shows an embodiment of operations of the storage control unit 22. The example operations will be described below using a case where the lead part Lj and full content Fj (j=1, 2, 3 . . . ) are recorded as shown in FIG. 3 or 4.

The content server 22 receives content from the communication unit 21 (step 201). Then, the content server 22 stores full content Fj as all of the content in the first cache 24 (step 202). The content server 22 also passes a copy of the full content Fj on to the input/output unit 26 and instructs the input/output unit 26 to store the copy on a tape (step 203).

Thus, the input/output unit 26 sends the copy of the full content Fj to the tape library 10 so as to write the copy onto a tape. As a result, the input/output unit 26 receives the identification information of the tape (tape ID) and a recording start position kj on the tape from the tape library 10. Then the storage control unit 22 acquires these pieces of information (step 204) and obtains a data amount bj of a leading part Lj (step 205).

In this case, the data amount bj of the leading part Lj is obtained as follows. For example, if the first recording method is used, the data amount of the leading part Lj is obtained from Formula 1' below as described above.

$$bj=(kj-mj+\alpha \times Ls) \times Bpps/Ls \qquad \text{Formula 1'}$$

Here, mj is obtained from mj=mj−1+bj−1/Bpl using mj−1 and bj−1 calculated and then stored in a memory when the leading part Lj−1 is stored in the second cache 25.

Bpl, Ls, Bpps, and α are predetermined constants.

If the second recording method is used, the data amount bj of the leading part Lj is obtained from Formula 2' below as described above.

$$bj=(kj+(\alpha+\beta) \times Ls) \times Bpl \times Bpps/(Bpl \times Ls - Bpps) \qquad \text{Formula 2'}$$

Here, Bpl, Ls, Bpps, and α are predetermined constants. β may be a predetermined constant, or a numerical value obtained by estimating the time during which the robot mechanism transports the tape, according to a tape ID acquired in step 204.

Subsequently, the storage control unit 22 instructs the data extraction unit 23 to cut bj bytes as the leading part Lj from the top of the content (step 206). Then, the data extraction unit 23 cuts the leading part Lj according to the instruction and returns the cut-out leading part Li to the storage control unit 22.

Thus, the storage control unit 22 receives the leading part Lj and stores it in the second cache 25 (step 207). Lastly, the storage control unit 22 stores the content ID, the tape ID, the recording start position mj of the leading part Lj, and the data amount bj of the leading part Lj in a memory in such a manner that these pieces of information are associated with one another (step 208). Here, the recording start position mj is obtained from mj=mj−1+bj−1/Bpl as described above.

Subsequently, if the leading part Lj is transferred from the second cache 25 to a tape, the storage control unit 22 performs the following operations.

For example, if the first recording method is used, the storage control unit 22 acquires a tape ID using the content ID of content to be transferred as a key and identifies a tape to which the leading part Lj is to be transferred, by the tape ID. Then, the storage control unit 22 issues a command for advancing the tape to the recording start position mj associated with the content ID and then writes the leading part Lj in such a manner that the leading part Lj follows the recording start position mj.

If the second recording method is used, the storage control unit 22 specifies, for example, a tape previously loaded in the tape drive, as a tape to which the leading part Lj is to be transferred. Then, the storage control unit 22 issues a command for advancing the tape to the recording start position mj associated with the content ID and then writes the leading part Lj in such a manner that the leading part Lj follows the recording start position mj.

In this embodiment, the third recording method may be used when full content is transferred to a tape in step 203. Hereafter, operations performed when the full content is recorded using the third recording method will be described.

Figure 7:
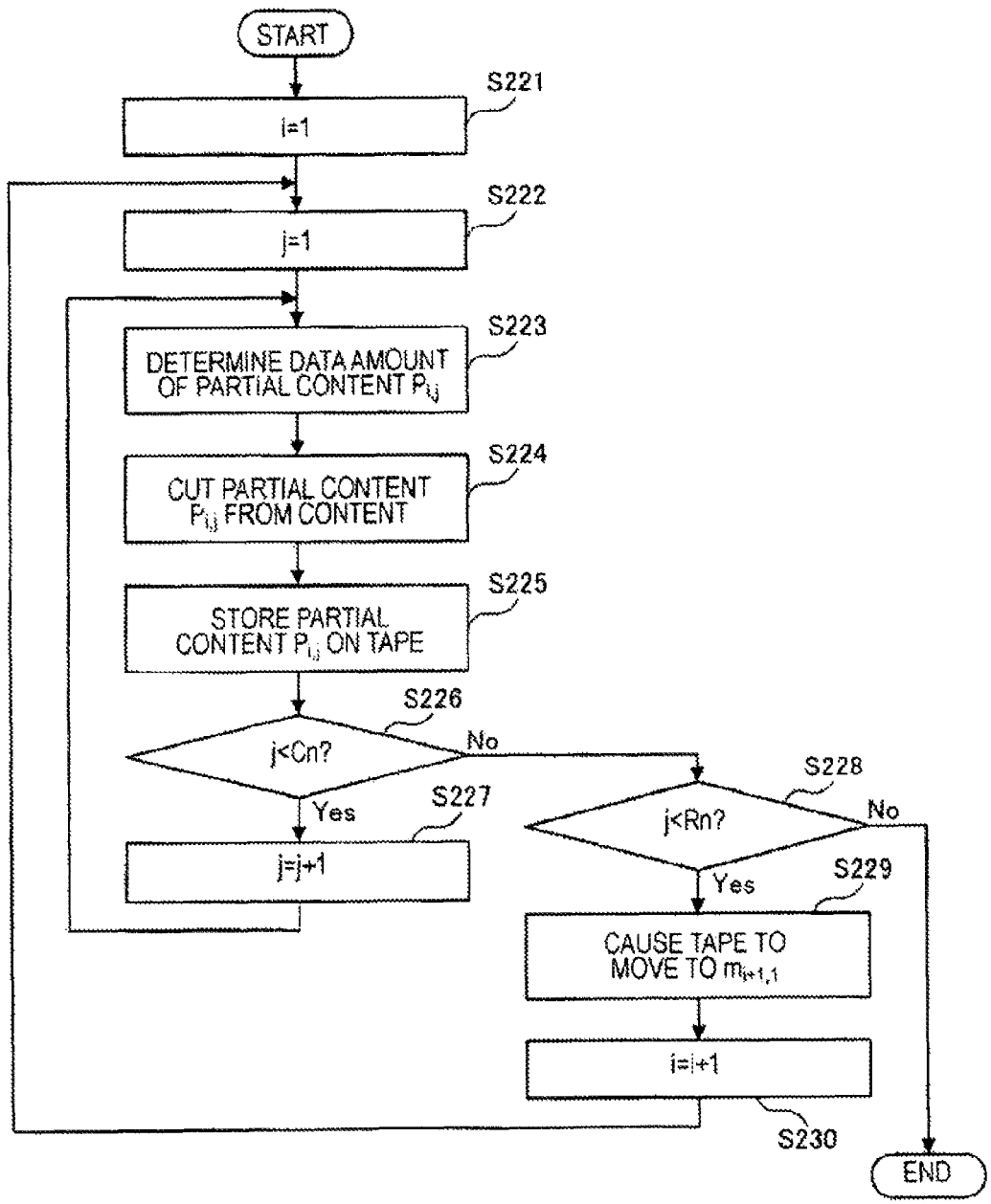
FIG. 7 is a flowchart showing an embodiment of operations performed when the content server writes content.

Referring to FIG. 7, there is shown operations performed by the storage control unit 22 at that time. The storage control unit 22 substitutes "1" for a variable i for counting sub-areas (step 221) and "1" for a variable j for counting pieces of content (step 222). Hereafter, the following process will be performed with respect to all (i, j) combinations (i=1, 2, 3, . . . Rn and j=1, 2, 3, . . . Cn). Here, Rn refers to the number of sub-areas provided on the tape and Cn refers to the number of pieces of content recorded on the tape.

First, the storage control unit 22 determines a data amount $bi,j$ of partial content $Pi,j$ (step 223). Here, if i=1, the data amount $bi,j$ may be determined arbitrarily. For example, it is considered to set the data amount $bi,j$ to twenty times the minimum buffer data amount. The minimum buffer data amount refers to the data amount of a block as a unit for performing the above-described error-check.

If i>1, the data amount $bi,j$ is obtained from Formula 3' below.

$$bi,j=bi-1,j+1+(bi-1,j+1-bi-1,j) \times Bpl \times Ls/Bpps \qquad \text{Formula 3'}$$

Here, what are calculated and then stored in a memory when the partial content Pi−1,j and Pi−1,j+1 is written onto the tape are preferably used as bi−1,j and bi−1,j+1. Bpl, Ls, and Bpps are predetermined constants.

Subsequently, the storage control unit 22 instructs the data extraction unit 23 to cut bi,j bytes as the partial content Pi,j from the top of the content (step 224). Then, the data extraction unit 23 cuts the partial content Pi,j according to the instruction and returns the cut-out partial content Pi,j to the storage control unit 22.

Thus, the storage control unit 22 receives the partial content Pi,j and instructs the input/output unit 26 to write the partial content Pi,j onto a tape (step 225). Then, the input/output unit 26 outputs the partial content Pi,j to the tape library 10 so as to write the partial content Pi,j onto a tape. In this case, the content ID is also written onto the tape together with the partial content Pi,j. Also, the storage control unit 22 stores the bi,j and mi,j in a memory. The mi,j is obtained from mi,j=mi−1,j+(bi−1,j/Bpps)×Ls.

Lastly, the storage control unit 22 determines whether j is smaller than Cn (step 226). If j is smaller than Cn, the storage control unit 22 adds "1" to j (step 227) and returns to step 223. If j has reached Cn, the storage control unit 22 determines whether i is smaller than Rn (step 228). If i is smaller than Rn, the storage control unit 22 issues a command for causing the tape to move from its top to the position of mi+1,1 (step 229), adds "1" to i (step 230), and returns to step 222 (step 229). The mi+1,1 is obtained from mi+1,1=mi,1+(bi,1/Bpps)×Ls.

Next, operations performed when the content server 20 reads content will be described. First, the communication unit 21 receives a request for playback of content. Here, it is assumed that the content playback request includes content identification information (content ID). Then, the communication unit 21 passes the content ID and playback request on to the playback control unit 27. Thus, the playback control unit 27 starts operations.

Figure 8:
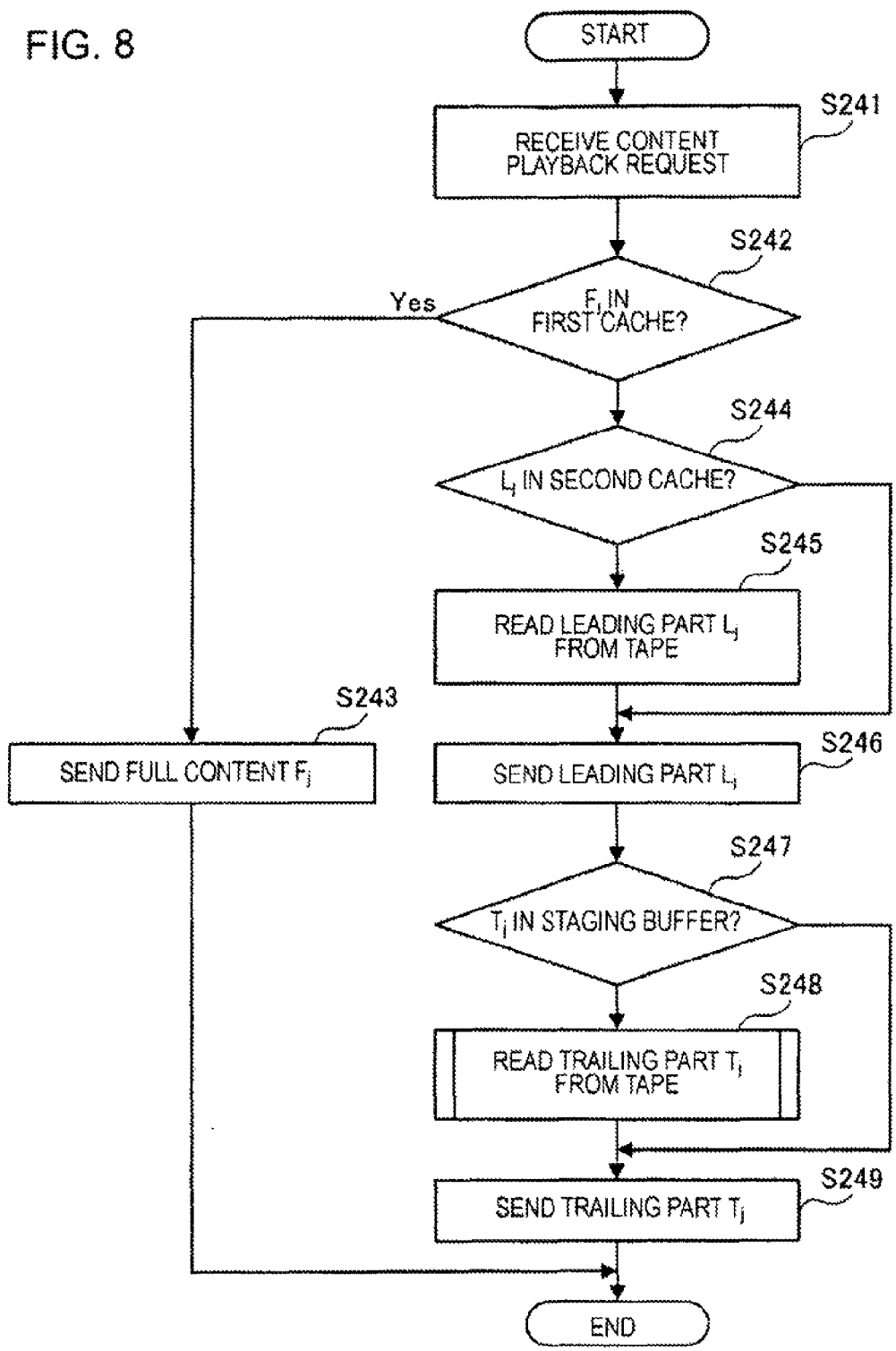
FIG. 8 is a flowchart showing an embodiment of operations performed when the content server reads content.

Referring to FIG. 8, there is shown operations performed by the playback control unit 27. First, the playback control unit 27 receives a content playback request from the communication unit 21 (step 241). Then, the playback control unit 27 determines whether the full content Fj as all of the content is stored in the first cache 24 (step 242). As a result, if the full content Fj is stored in the first cache 24, the playback control unit 27 reads it from the first cache 24 and passes it on to the communication unit 21 (step 243).

If the full content Fj is not stored in the first cache 24, the playback control unit 27 determines whether the leading part Lj of this content is stored in the second cache 25 (step 244). If the leading part Lj is not stored in the second cache 25, the playback control unit 27 instructs the input/output unit 26 to read the leading part Lj from a tape (step 245). Specifically, the playback control unit 27 identifies the recording start position mj of the leading part Lj using the content ID as a key, and then instructs the input/output unit 26 to issue a command for causing the tape to move to that position as well as a command for reading data from that position. Thus, the playback control unit 27 acquires the leading part Lj read by the input/output unit 26 and then stores the leading part Lj in the second cache 25 and also passes it on to the communication unit 21 (step 246). If the leading part Lj is stored in the second cache 25, the playback control unit 27 reads it from the second cache 25 and passes it on to the communication unit 21 (step 246).

Subsequently, the playback control unit 27 determines whether a trailing part Tj of this content is stored in the staging buffer 28 (step 247). If the trailing part Tj is not stored in the staging buffer 28, the playback control unit 27 instructs the input/output unit 26 to read the trailing part Tj from a tape (step 248). Specifically, the playback control unit 27 identifies the recording start position of the trailing part Tj using the content ID as a key, and instructs the input/output unit 26 to issue a command for causing the tape to move to that position as well as a command for reading data from that position. The recording start position of the trailing part Tj is obtained from kj+(mj−mj−1)/Bpl. Thus, the playback control unit 27 acquires the trailing part Tj read by the input/output unit 26 and then stores the trailing part Tj in the staging buffer 28 and also passes it on to the communication unit 21 (step 249). If the trailing part Tj is stored in the staging buffer 28, the playback control unit 27 reads the trailing part Tj from the staging buffer 28 and passes it on to the communication unit 21 (step 249).

While the trailing part of one piece of content is read in step 248 in this operation example, the number of trailing parts to be read is not limited to one. For example, if multiple pieces of content are recorded on an identical tape in a format as shown in FIG. 5 and a request for playback of the multiple pieces of content is received, these pieces of content may be read and played back simultaneously.

Figure 9:
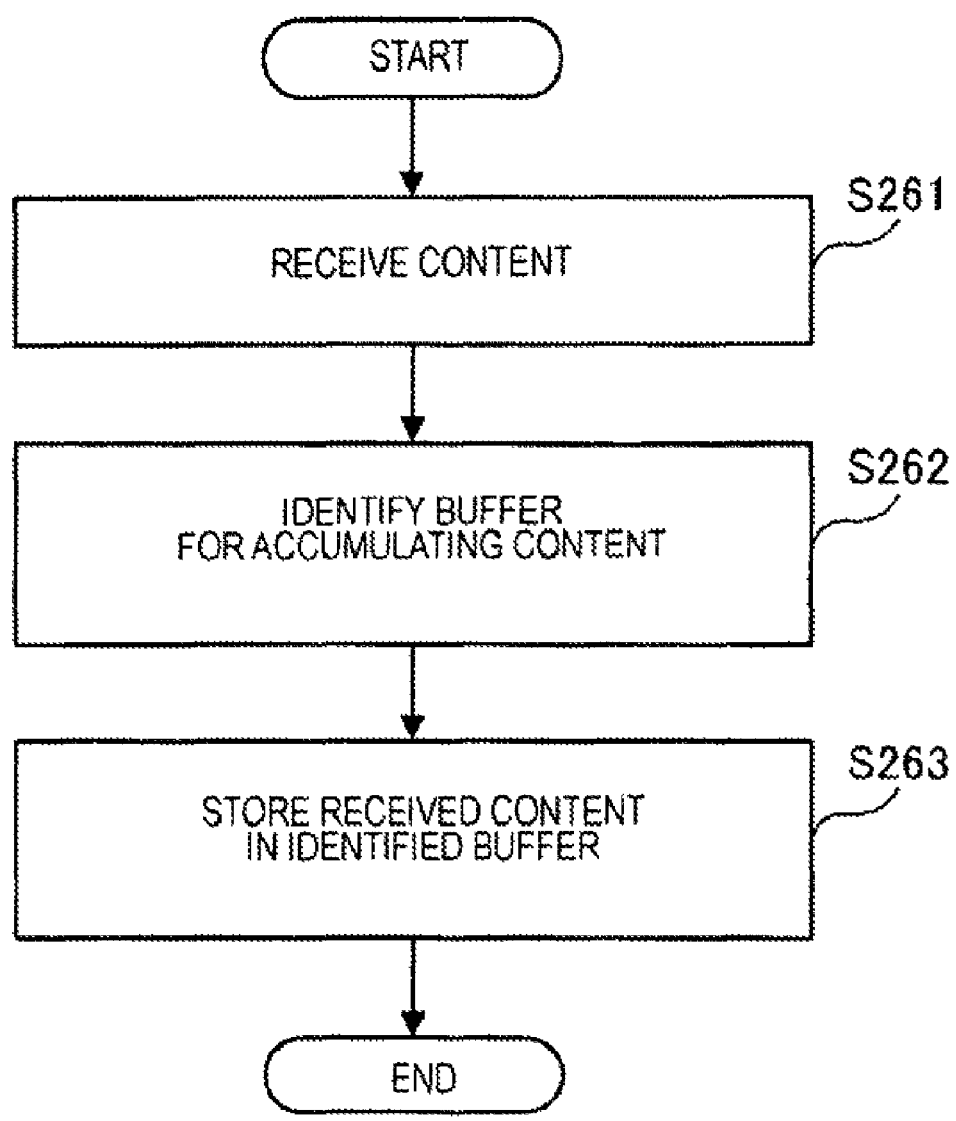
FIG. 9 is a flowchart showing an embodiment of operations performed when the content server reads content.

Referring to FIG. 9, there is shown operations performed by the playback control unit 27 at that time. First, the playback control unit 27 receives content read from a tape, from the input/output unit 26 (step 261). Then, the playback control unit 27 identifies a buffer where the read content should be accumulated (step 262), according to the content ID attached to the read content. Then, the playback control unit 27 stores the content received in step 261 in the buffer identified in step 262 (step 263). By performing these operations, the playback control unit 27 accumulates data pieces of each content recorded on sub-areas shown in FIG. 5, in a buffer for the corresponding content.

Figure 10:
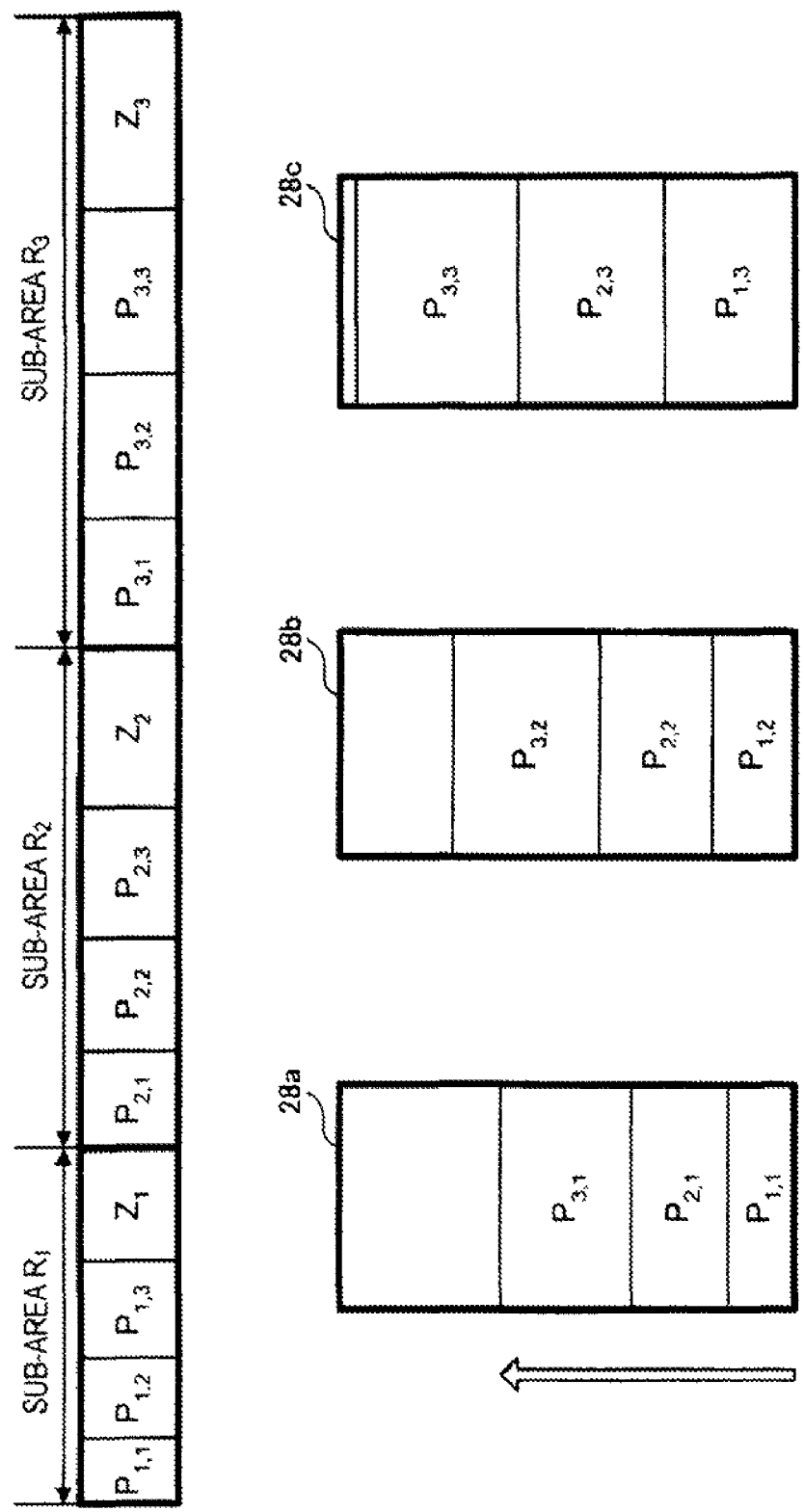
FIG. 10 is a schematic diagram showing an aspect of reading of pieces of content into buffers.

FIG. 10 shows such an aspect of reading of data into buffers. Specifically, partial content P1,1, partial content P2,1, and partial content P3,1 of first content is stored in a buffer 28a, partial content P1,2, partial content P2,2, and partial content P3,2 of second content is stored in a buffer 28b, and partial content P1,3, partial content P2,3, and partial content P3,3 of third content is stored in a buffer 28c. In this diagram, the buffers are shown as conceptual diagrams showing that the buffers are sequentially accessed; however, the buffers need not have sequential physical memory addresses. An open arrow indicates a direction in which data is stored. Since the multiple pieces of content are buffered almost simultaneously in this way, the multiple pieces of content are efficiently played back.

Also, a portion of data to be played back first when a request for playback of the data is made may be previously buffered. For example, data recorded on the sub-areas R1 and R2 close to the top of the tape in FIG. 10 may be previously buffered in a memory buffer. Such previous buffering allows absorption of a playback delay time caused by a tape load time or the like.

It is assumed in the above-description that the recording density Bpl of data on a tape, the moving speed Ls of the tape, and the playback speed Bpps of content are fixed values. However, they need not always be fixed values. For example, the recording density Bpl of data on a tape and the moving speed Ls of the tape may vary depending on a tape on which content is to be recorded. Also, the playback speed Bpps of content may vary depending on content.

In this embodiment, content is recorded on a tape using any of the first to third recording methods, as described above. Specifically, a first part (e.g., leading part) and a second part (e.g., trailing part) following the first part of content are recorded so that the second part is made ready to be played back before playback of the first part ends. This allows a reduction in the time taken before content, all of which is recorded on a tape, starts to be played back. In this case, in order to bring the time at which the playback of the first part ends the closest possible to the time at which the second part is made ready to be played back, the second part is recorded in a position away by the distance that the tape travels during the playback of the first part. Thus, an area between the first and second parts is effectively used.

Figure 11:
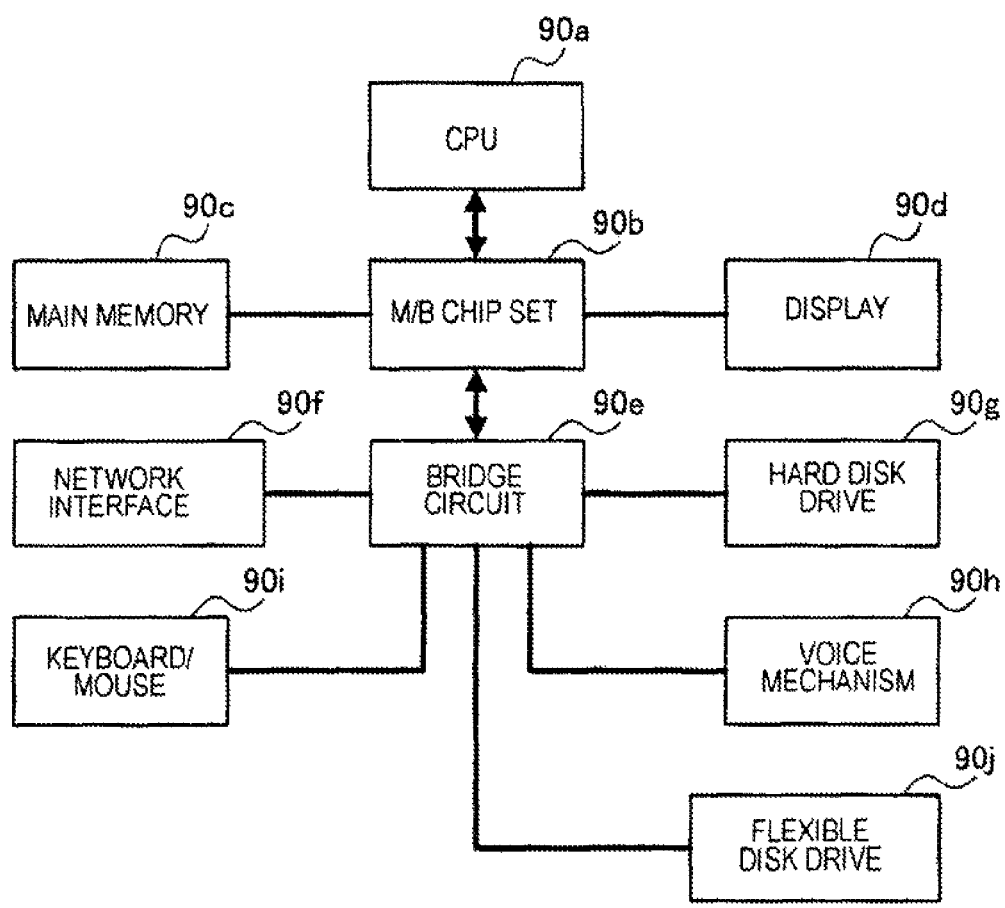
FIG. 11 is a schematic diagram showing a hardware configuration of a computer.

Referring to FIG. 11, where is shown a computer hardware configuration that includes a central processing unit (CPU) 90a as a computation means, a main memory 90c coupled to the CPU 90a via an M/B (motherboard) chipset 90b, and a display 90d coupled to the CPU 90a via the M/B chip set 90b. Coupled to the M/B chipset 90b via a bridge circuit 90e are a network interface 90f, a hard disk drive (HDD) 90g, a voice mechanism 90h, a keyboard/mouse 90i, and a flexible disk drive 90j.

These components are coupled to one another via buses in FIG. 11. For example, the CPU 90a and M/B chip set 90b as well as the M/B chip set 90b and main memory 90c are coupled via a CPU bus. The M/B chip set 90b and display 90d may be coupled via an accelerated graphics port (AGP). If the display 90d includes a PCI Express-compliant video card, the M/B chip set 90b and this video card are coupled via a PCI Express (PCIe) bus. The network interface 90f is coupled to the bridge circuit 90e via, e.g., PCI Express. The hard disk drive 90g is coupled to the bridge circuit 90e via, e.g., serial AT attachment (ATA), parallel transfer ATA, or peripheral components interconnect (PCI). The keyboard/mouse 90i and flexible disk drive 90j are coupled to the bridge circuit 90e via universal serial buses (USB).

The present invention may be realized solely by hardware or software. Or the present invention may be realized by both hardware and software. That is, the present invention may be realized by any of a computer, a data processing system, and a computer program. Such a computer program may be stored in a computer-readable medium and provided. Among such computer-readable media are electronic media, magnetic media, optical media, electromagnetic media, infrared or semiconductor systems (devices), and propagation media. More specifically, computer-readable media include semiconductors or solid state storage devices, magnetic tapes, detachable computer diskettes, random access memories (RAMs), read-only memories (ROMs), rigid magnetic disks, and optical disks. Among currently available optical disks are compact disc-read only memories (CD-ROMs), compact disc-read/write (CD-R/W), and digital versatile discs (DVDs).

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method, comprising:
    receiving a request to play back content;
    determining whether all of the content is stored in a first cache;
    sending the content from the first cache to a communication interface when all of the content is determined to be stored in the first cache;
    determining whether a leading part of the content is stored in a second cache when all of the content is not stored in a first cache;
    sending the leading part of the content from the second cache to the communication interface when the leading part of the content is determined to be stored in the second cache;
    issuing a first command to retrieve the leading part of the content from a tape when the leading part of the content is not stored in the second cache; and
    sending the leading part of the content received from the tape to the communication interface after issuing the first command.

2. The method of claim 1, wherein the leading part of the content received from the tape is stored in the second cache prior to sending the leading part of the content to the communication interface.

3. The method of claim 1, wherein issuing the first command includes identifying a starting position of the leading part of the content on the tape, causing a second command to be issued for causing the tape to be moved to the starting position, and causing a third command to be issued for reading the leading part from the tape at the starting position.

4. The method of claim 3, further comprising:
    determining whether a trailing part of the content is stored in a buffer;
    sending the trailing part of the content from the buffer to the communication interface when the trailing part of the content is determined to be stored in the buffer;
    issuing a fourth command to retrieve the trailing part of the content from the tape when the trailing part of the content is not stored in the buffer; and
    sending the trailing part of the content received from the tape to the communication interface after issuing the fourth command.

5. The method of claim 4, wherein issuing the fourth command includes identifying a starting position of the trailing part of the content on the tape, causing a fifth command to be issued for causing the tape to be moved to the starting position, and causing a sixth command to be issued for reading the leading part from the tape at the starting position.

6. The method of claim 4, wherein pieces of multiple trailing parts are received in a sequence of pieces alternating between the trailing parts, each piece being less than a whole of the associated trailing part, wherein the pieces of each trailing part are accumulated in association with each other.

7. The method of claim 4, further comprising storing the trailing part received from the tape in the buffer.

8. An apparatus, comprising:
    a processor;
    a first cache;
    a second cache; and
    a communication interface
    the processor being configured to:
        receive a request to play back content;
        determining whether all of the content is stored in the first cache;
        sending the content from the first cache to the communication interface when all of the content is determined to be stored in the first cache;
        determining whether a leading part of the content is stored in the second cache when all of the content is not stored in a first cache;
        sending the leading part of the content from the second cache to the communication interface when the leading part of the content is determined to be stored in the second cache;
        issuing a first command to retrieve the leading part of the content from a tape when the leading part of the content is not stored in the second cache; and
        sending the leading part of the content received from the tape to the communication interface after issuing the first command.

9. The apparatus of claim 8, wherein the leading part of the content received from the tape is stored in the second cache prior to sending the leading part of the content to the communication interface.

10. The apparatus of claim 8, wherein issuing the first command includes identifying a starting position of the leading part of the content on the tape, causing a second command to be issued for causing the tape to be moved to the starting position, and causing a third command to be issued for reading the leading part from the tape at the starting position.

11. The apparatus of claim 10, wherein the processor is further configured to:
    determine whether a trailing part of the content is stored in a buffer;
    sending the trailing part of the content from the buffer to the communication interface when the trailing part of the content is determined to be stored in the buffer;
    issuing a fourth command to retrieve the trailing part of the content from the tape when the trailing part of the content is not stored in the buffer; and
    sending the trailing part of the content received from the tape to the communication interface after issuing the fourth command.

12. The apparatus of claim 11, wherein issuing the fourth command includes identifying a starting position of the trailing part of the content on the tape, causing a fifth command to be issued for causing the tape to be moved to the starting position, and causing a sixth command to be issued for reading the leading part from the tape at the starting position.

13. The apparatus of claim 11, wherein pieces of multiple trailing parts are received in a sequence of pieces alternating between the trailing parts, each piece being less than a whole of the associated trailing part, wherein the pieces of each trailing part are accumulated in association with each other.

14. The apparatus of claim 11, wherein the trailing part received from the tape is stored in the buffer.

15. The apparatus of claim 8, further comprising an input/output unit configured for coupling to a tape library.

16. A computer program product, comprising:
    a non-transitory computer readable storage medium having computer readable program code embodied therewith, the computer readable program code comprising:
    computer readable program code configured to receive a request to play back content;
    computer readable program code configured to determine whether all of the content is stored in a first cache;

computer readable program code configured to send the content from the first cache to a communication interface when all of the content is determined to be stored in the first cache;

computer readable program code configured to determine whether a leading part of the content is stored in a second cache when all of the content is not stored in a first cache;

computer readable program code configured to send the leading part of the content from the second cache to the communication interface when the leading part of the content is determined to be stored in the second cache;

computer readable program code configured to issue a first command to retrieve the leading part of the content from a tape when the leading part of the content is not stored in the second cache; and computer readable program code configured to send the leading part of the content received from the tape to the communication interface after issuing the first command.

17. The computer program product of claim 16, wherein the leading part of the content received from the tape is stored in the second cache prior to sending the leading part of the content to the communication interface.

18. The computer program product of claim 16, wherein issuing the first command includes identifying a starting position of the leading part of the content on the tape, causing a second command to be issued for causing the tape to be moved to the starting position, and causing a third command to be issued for reading the leading part from the tape at the starting position.

19. The computer program product of claim 16, further comprising:

determining whether a trailing part of the content is stored in a buffer;

sending the trailing part of the content from the buffer to the communication interface when the trailing part of the content is determined to be stored in the buffer;

issuing a fourth command to retrieve the trailing part of the content from the tape when the trailing part of the content is not stored in the buffer;

sending the trailing part of the content received from the tape to the communication interface after issuing the fourth command.

20. The computer program product of claim 19, wherein pieces of multiple trailing parts are received in a sequence of pieces alternating between the trailing parts, each piece being less than a whole of the associated trailing part, wherein the pieces of each trailing part are accumulated in association with each other.

\* \* \* \* \*